United States Patent [19]

Cretors

[11] 4,288,686
[45] Sep. 8, 1981

[54] THERMOSTAT FOR POPCORN COOKING CONTAINERS OR THE LIKE

[75] Inventor: Charles D. Cretors, Lake Forest, Ill.

[73] Assignee: C. Cretors and Company, Chicago, Ill.

[21] Appl. No.: 104,569

[22] Filed: Dec. 17, 1979

[51] Int. Cl.³ .............................................. H05B 1/02
[52] U.S. Cl. .................................. 219/512; 219/494; 219/508; 337/312; 337/348; 99/323.5; 99/323.7
[58] Field of Search ............... 219/494, 512, 519, 483, 219/508, 510; 337/312, 318, 333, 346, 348, 359, 342; 99/323.5, 325, 329 R, 323.7

[56] References Cited

U.S. PATENT DOCUMENTS

| | | | |
|---|---|---|---|
| 1,780,462 | 11/1930 | Carmean et al. | 337/358 |
| 2,134,682 | 11/1938 | Burch | 219/494 |
| 2,361,162 | 10/1944 | Arnold | 337/348 |
| 2,440,025 | 4/1948 | Singleton | 337/348 X |
| 2,870,314 | 1/1959 | Miller | 219/512 |
| 2,988,621 | 6/1961 | Cassidy | 337/359 X |
| 3,095,326 | 6/1963 | Green et al. | 219/494 |
| 3,821,679 | 6/1974 | Summe et al. | 337/348 |
| 3,846,729 | 11/1974 | Sorimachi | 337/348 |

FOREIGN PATENT DOCUMENTS 2316155  10/1974  Fed. Rep. of Germany ...... 337/348

Primary Examiner—Gene Z. Rubinson
Assistant Examiner—M. Paschall
Attorney, Agent, or Firm—Neuman, Williams, Anderson & Olson

[57] ABSTRACT

A thermostat is disclosed which includes a bimetal element in the form of an elongated strip and a trip mechanism formed by an elongated metal strip and a member having a U-shaped portion operative as a spring and an arm portion projecting from one leg of the U-shaped portion to form a reset lever. The trip mechanism operates electrical contacts on metal strips and has an overcenter operation to provide a snap action. The thermostat is connectable in series with a cooking temperature control thermostat of a popcorn cooking machine to protect against dangerously high operating temperatures.

9 Claims, 7 Drawing Figures

THERMOSTAT FOR POPCORN COOKING CONTAINERS OR THE LIKE

This invention relates to a thermostat for use in popcorn popping machines or the like and more particularly to a thermostat which protects against the effects of dangerously high operating temperatures which can result from malfunctions of components of the machine. The thermostat is relatively simple and inexpensive in construction while being compact and readily mounted. It is adjustable, can control relatively high electrical loads and is adaptable for a variety of applications.

BACKGROUND OF THE INVENTION

In a popcorn cooking machine of a known type, an electric heating element is mounted on a container and a cooking temperature control thermostat is connected in series with the heating element to control the cooking temperature. The cooking temperature control thermostat is usually mounted on the outside of the cooking container and typically has a rotatable knob or other adjustable control for adjusting the cooking temperature which may be on the order of from 400° to 500° F.

Such machines usually operate quite satisfactorily for substantial periods of time and although problems have developed, they have not been recognized and dealt with, apparently because they usually develop only after relatively long periods of use. One of such problems is that the cooking temperature control thermostat may fail to open when the operating temperature exceeds the desired operating temperature. When this happens, the temperature may rise quite rapidly and if, without realizing that the cooking temperature control thermostat has failed, the operator places oil in the container, the oil will not only burn but may splatter to burn the operator. In a typical machine, the temperature will rise at a rate of about 50° F. per minute from a normal operating temperature of 475° F. to reach a temperature of 650° F. in a little over three minutes at which temperature the oil will burn. If a longer time has elapsed, the temperature may be over 900° F. and the reaction is almost explosive.

Such failures of the cooking temperature control thermostats are very likely to occur after prolonged periods of use because such thermostats typically comprise a bimetal element or the like which is effective to move two contacts apart to break the circuit and allow the heating element to cool, the contacts being then re-engaged to again complete the circuit. With the repeated cycling movements produced in long periods of use, a possible malfunction of the thermostat is likely and cannot be readily avoided by improvements in design.

The prior art also has deficiencies in that thermostats which might be effectively used for protecting against the aforementioned problems have not been available. The provision of a meltable fuse element for opening the circuit when a high temperature is reached is a possibility but is not a practical solution. Mechanical forces applied to the cooking container during normal operation can cause a fuse to be broken before the melting temperature thereof is reached and the replacement of a fuse can be a frustrating problem to the operator of a machine especially where the fuse is of a special type which is not generally available.

Thermostats which include bimetal disc elements or the like have had constructions such as not to be suitable for protecting against the aforementioned conditions. For example, one problem is that they have not been operative to open a circuit at a relatively high temperature without having the undesirable feature of being operative to reset themselves at a lower but still elevated temperature.

Thermostats of the type having elongated connections between a temperature sensing point and a point where electrical contacts are located and operated are not at all suitable for use in popcorn popping machines or the like.

As a result of the failure to recognize the problems involved and as a result of the inadequacies of the prior art devices, there has been no solution to the aforementioned dangerous problems which can result from failures of the cooking temperature control thermostats of popcorn popping machines or the like.

SUMMARY OF THE INVENTION

This invention was evolved with the general object of protecting against malfunctions of popcorn cooking machines and the like to prevent injuries to operators and to prevent damage to the machines.

Another object of the invention is to provide a thermostat which will open an electrical circuit at a predetermined high temperature without being operative to close the circuit when the temperature drops to an ambient level.

A further object of the invention is to provide a thermostat which is highly reliable in operation and which can control relatively high electrical loads while being compact and simple and inexpensive in construction.

The invention resides in part in the recognition of the aforementioned problems with popcorn cooking machines and the like and in recognizing that the problems might be alleviated by use of a separate safety thermostat in series with the cooking temperature control thermostat of a machine with the separate thermostat being operative to open the circuit when the temperature exceeds a safe operating temperature. By providing such a safety thermostat, the popcorn cooking machine can be protected against the effects of malfunction of the cooking temperature control thermostat thereof, to prevent injury to operators as well as to protect the machine against damage.

In accordance with the invention, a thermostat is provided which includes a trip mechanism operable between a stable reset condition and a stable tripped condition, the trip mechanism being connected to a movable portion of a temperature sensitive member to be tripped from the reset condition to the tripped condition when the temperature exceeds a certain high temperature of on the order at least 500° F. The trip mechanism, after being placed in the tripped condition, remains therein irrespective of lowering of the temperature of the temperature sensitive member to room temperature. Switch means are connected to the trip mechanism for operation therefrom, being preferably opened in response to tripping of the trip mechanism.

The thermostat is preferably connected in series with the cooking temperature control thermostat of a cooking machine to protect against the problems resulting from failure of the cooking temperature control thermostat to open the circuit to the heating element of the machine. Since the thermostat remains in the tripped condition, it will not be possible to operate the machine without intervention of the operator. Preferably, however, the thermostat includes a manual reset so that after the problem with the cooking temperature control thermostat is corrected, the machine may be again operated. It is not necessary to replace a fuse.

In accordance with a specific feature of the invention, the trip mechanism comprises a pair of elements connected between a movable portion of a temperature sensitive element and a base structure with at least one of the elements of the trip mechanism being operative as a spring to establish an over-center operation with stable reset and tripped conditions. By using elements which are separate from the temperature sensing element to provide spring characteristics, it is possible to obtain a tripping operation at a quite high temperature without having the undesirable feature of obtaining a reset operator at a lower but still elevated temperature. Thus, the device will not reset itself without operator intervention.

Additional features of the invention relate to the construction of the thermostat in a manner such that it is inexpensive in construction while being highly reliable and capable of handling high electrical loads. In particular, the temperature sensitive element of the thermostat may be in the form of an elongated bimetal element and the trip mechanism may comprise a first element in the form of an elongated metal strip in generally parallel relation to the bimetal element and a second element including a generally U-shaped portion of spring metal having ends engaged between ends of the bimetal element and the first element of the trip mechanism. With this arrangement, an over-center operation can be obtained and the tripping operation can be effected at a very high temperature while at the same time, the device will not reset itself at ambient temperature levels.

Preferably, the trip mechanism operates electrical contacts by directly transmitting force through an insulating member from the metal strip of the trip mechanism to a metal strip which carries one electrical contact, a second contact being carried on another metal strip in parallel relation to the first metal strip.

Another feature is in providing an adjustment means which engages the second strip of the contact assembly to transmit a force through the contacts to the metal strip of the trip mechanism in a manner such as to control the temperature at which the trip operation is obtained.

Still another feature relates to the provision of a reset means which is preferably in the form of a lever arm integrally connected to one leg of the U-shaped portion of the spring element of the trip mechanism.

This invention contemplates other objects, features and advantages which will become more fully apparent from the following detailed description taken in conjunction with the accompanying drawings.

DESCRIPTION OF A PREFERRED EMBODIMENT

Figure 1:
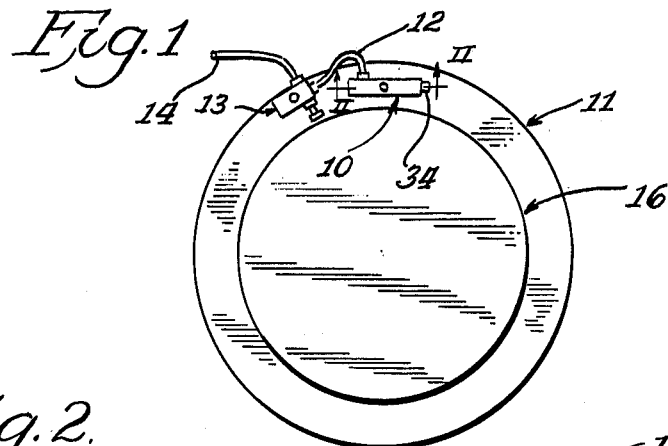
FIG. 1 is a bottom plan view of a cooking container and diagrammatically illustrates a safety thermostat mounted on the bottom of the container and electrically connected in circuit with a cooking temperature control thermostat and an electric heater, in accordance with the invention.

Referring to FIG. 1, reference numeral 10 generally designates a safety thermostat constructed in accordance with the principles of the invention and shown mounted on the bottom of a popcorn cooking container 11 and connected electrically through a cable 12 to a cooking temperature control thermostat 13. The cooking temperature control thermostat 13 is connected to a cable 14 for supply of electrical power and is connected through a cable 15 to an electric heater 16.

In the arrangement as diagrammatically illustrated, the safety thermostat 10 as well as the control thermostat 13 are mounted in close proximity to the heater 16 on the bottom of the cooking container 11. This is desirable in most applications but it will be understood that the safety thermostat 10 as well as the control thermostat 13 might be located at other positions such as on the side of the container. It is also noted that the components of the safety thermostat 10 might be included with components of the control thermostat 13 in a common housing.

Figures 2, 4:
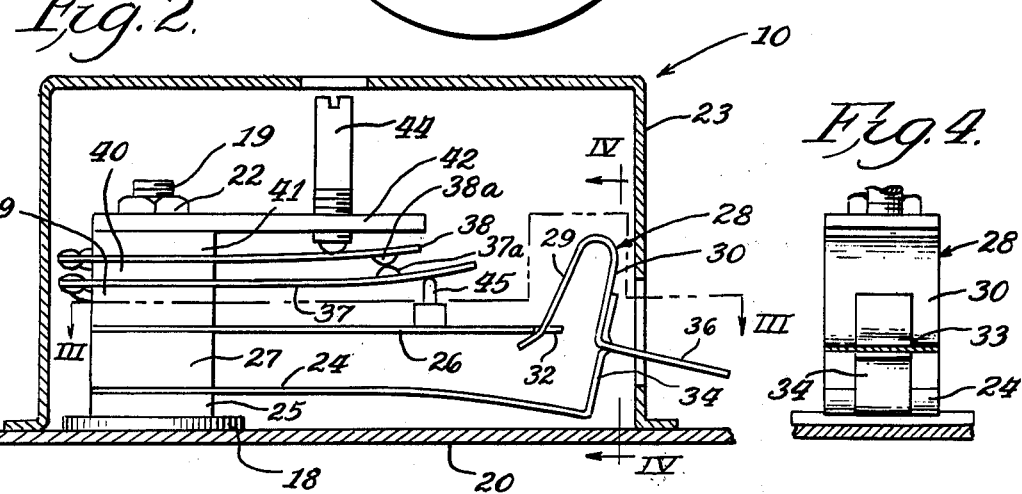
FIG. 2 is a sectional view through the safety thermostat, illustrating operative components thereof in side elevation.
FIG. 4 is another sectional view taken substantially along line IV—IV of FIG. 2.
Figure 3:
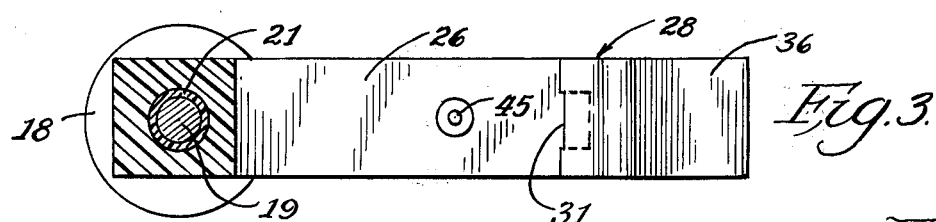
FIG. 3 is a sectional view taken substantially along line III—III of FIG. 2.

The construction of the safety thermostat 10 is shown in FIGS. 2, 3 and 4. As illustrated, a plate 18 which carries a threaded stud 19 may be welded or otherwise secured to a metal bottom wall portion 20 of the container 11. The stud 19 projects through a sleeve 21 of insulating material which extends through elements of the device and through insulating spacers therebetween. A nut 22 is threaded on the end of the stud 19 to secure the assembly to the container wall portion 20 and a housing 23 may be provided to protect the device and to protect users against electrical shock.

The mechanism includes a bimetal element 24 which is preferably in the form of an elongated strip and which has one end mounted on the stud 19, being separated from the plate 18 by a relatively thin washer 25. Washer 25 may preferably be of metal to provide direct heat transmission from the container wall portion 20 to the bimetal element 24.

The bimetal element 24 is deformed in response to temperature changes, the free end thereof being moved away from the container wall portion 20 in proportion to the temperature thereof.

A trip mechanism is provided for responding to movement of the free end of the bimetal element 24. The trip mechanism includes a first element which is in the form of an elongated metal strip 26 parallel to the element 24 and having one end mounted on the stud 19, separated from the element 24 by a washer 27. The free end of the strip 26 is connected to the free end of the bimetal element 24 through a spring which is in the form of a member 28 of resilient sheet metal including a U-shaped portion having legs 29 and 30. The leg 29 has a slot 31 therein which receives a reduced-width terminal end portion 32 of the strip 26. The leg 30 has a slot 33 therein which receives a reduced-width terminal end portion 34 of the bimetal element 24, the portion 34 being transverse to the main portion of element 24 and being formed to provide a generally V-shaped notch at the point where it extends through the notch 33 in the leg 30 of the member 28. The member 28 further includes a lever portion 36 which projects from the end of the leg portion 30 to form a trip indicator and a reset lever.

As hereinafter described, the trip mechanism operates in a manner such that the strip 26 is snapped downwardly to a tripped condition when a predetermined temperature is reached, to remain therein under the force of the spring defined by the U-shaped portion of the member 28 and to remain in the tripped condition even after the temperature drops to ambient levels.

The device 10 further includes a pair of metal strips 37 and 38 which carry interengageable contacts 37a and 38a, both strips being mounted on the stud 19 in generally parallel relation to the bimetal element 24 and the strip 26 of the trip assembly. An insulating washer 39 is disposed between the strip 26 and the strip 37 and another insulating washer 40 is disposed between the strips 37 and 38. A third insulating washer 41 is disposed between the strip 38 and a plate 42 which is mounted on the stud 19 and which carries an adjustment screw 44, a lower end of the adjustment screw 44 being engaged with the strip 38.

A pin 45 of insulating material is mounted on the strip 26 of the trip assembly and engages the strip 37 of the contact assembly to hold the contacts 37a and 38a in engagement in a reset condition of the device as shown in FIG. 2.

Figures 5, 6:
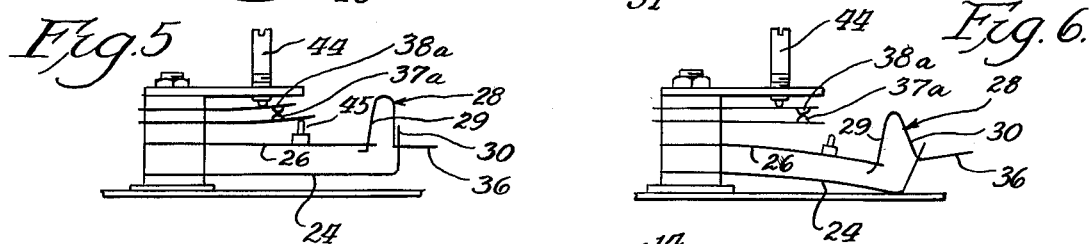
FIG. 5 is a view similar to FIG. 2 but in diagrammatic form, illustrating the position of parts in an unstable on-center condition.
FIG. 6 is a view similar to FIG. 5, illustrating the position of the parts in an over-center tripped condition of the device.
Figure 7:
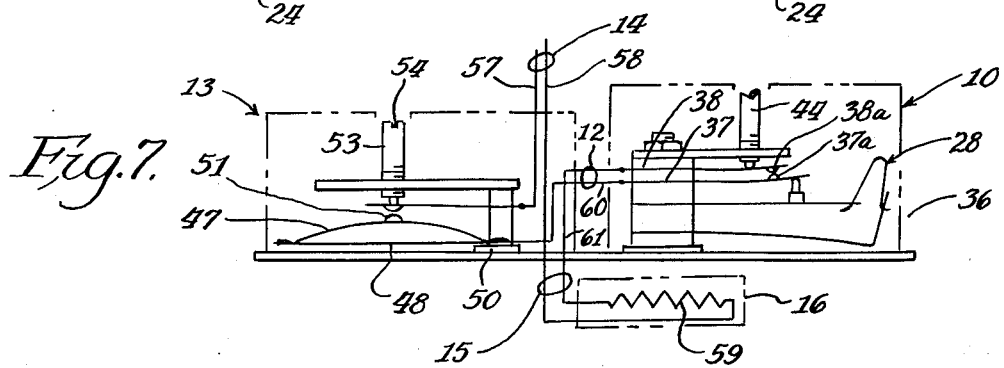
FIG. 7 is a diagrammatic electrical circuit diagram showing how the safety thermostat is connected in circuit with a heater and a cooking temperature control thermostat.

In operation, an increase in temperature causes the bimetal element 24 to be deformed to cause movement of the free end thereof away from the container wall portion 20. When the temperature reaches a certain level, the point at which the end portion 34 of the bimetal element 24 is engaged with the leg 30 of the member 28 will be aligned with the point at which the end portion 32 of the strip 26 engages the leg 29 and with the end of the strip 36 secured to the stud 19. At this time, the device is in an unstable on-center condition as diagrammatically depicted in FIG. 5. The U-shaped portion of the member 24 at this time is deformed to a maximum extent, exerting a maximum force between the ends of the bimetal element 24 and strip 26. When the temperature is increased further, the parts are moved over-center and the U-shaped portion of the member 28 then expands to move the free end of the metal strip 26 toward the container wall portion 20 to a tripped condition as depicted in FIG. 6. At this time, the strip 37 of the contact assembly is allowed to move toward the container wall portion 20 disengaging the contacts 37a and 38a. This action takes place in a very brief interval of time, with a "snap" action, and any arcing of the contacts 37a and 38a is minimized. As a result, the contacts 37a and 38a can carry large electrical loads without being large in size.

It is noted that the point at which the on-center condition is reached is controlled by the position of the strip 26 which is controlled by the adjustment screw 44, acting through the strip 38, the contacts 38a and 37a, the strip 37 and the insulating pin 45.

When the parts are placed in the reset condition as depicted in FIG. 6, they will remain therein indefinitely, even after the temperature is reduced to ambient conditions, with temperatures on the order of 70° F. or less. However, the device can be readily reset at any time by simply pushing the lever arm 36 toward the container wall portion 20 to move the parts back to the initial reset condition as depicted in FIG. 2.

FIG. 6 illustrates the connection of the safety thermostat 10 in circuit with the control thermostat 13 and heater 16 and also diagrammatically illustrates a construction of the control thermostat 13. As shown, the control thermostat 13 may include a pair of metal strip elements 47 and 48 having riveted connections between the ends thereof, one riveted connection being held in a fixed position, as by being mounted on a stud 50 which is secured to the container wall portion 20. The member 47 carries an electrical contact 51 which is engageable with another electrical contact 52 insulatingly carried at the end of screw 53 having a slot 54 for receiving the end of a screwdriver for adjustment. The contact 52 may be connected to one supply line 57 in the cable 14 while a second supply line 58 in the cable 14 may be connected to a resistance element 59 of the heater 16. The contact 51 may be connected through a conductor 60 in the cable 12 to the contact strip 37 of the safety thermostat 10 and the contact strip 38, as shown, may be connected through a conductor 61 to the heater element 59.

In operation, screw 53 is adjusted to a certain position to establish the desired temperature level. Initially, when the unit is cold, the contact 52 is engaged with the contact 51, and electrical current is then supplied to the heater element 59. When the temperature increases in response to energization of the element 59, the relative expansion of the elements 47 and 48 is such that the contact 51 tends to move away from the contact 52, being separated therefrom when the temperature reaches the preset value. Then the heater element 59 is de-energized to allow the temperature to drop and when it has dropped to a certain level below the preset level, the contact 51 is moved again to engagement with the contact 52, re-energizing the heater element 59.

This action occurs over and over again during operation of the thermostat and eventually, a condition is likely to occur in which the contacts 51 and 52 will not separate but will be fused together, it being noted that the disengaging movement of the contacts is relatively slow and a great deal of arcing normally occurs between the contacts.

Without the safety thermostat 10, such a failure of the control thermostat 13 could lead to the aforementioned serious problems. However, with the safety thermostat 10, the circuit may be automatically opened when the temperature exceeds a safe level which may be on the order of 500° to 600° F., for example, and injuries to the operator and damage to the cooking machine are obviated. As above noted, the unit cannot be re-energized without operator intervention. After the problem has been detected and remedied, the operator may press the reset level 36 to the reset condition, allowing normal operation of the apparatus.

It will be understood that modifications and variations may be effected without departing from the spirit and scope of the novel concepts of this invention.

What is claimed is:

1. In a cooking apparatus for popcorn popping or the like, including a cooking container, an electric heating element for heating said container and a cooking temperature thermostat mounted on said container and connected in series with said electrical heating element, said cooking temperature thermostat being arranged to open when the temperature reaches a preset value and to close when the temperature drops below a value somewhat below the preset value, a safety thermostat arranged to be mounted directly on said cooking container for connection between said cooking temperature control thermostat and said heating element, said safety thermostat comprising: a support structure arranged to be firmly mounted on said cooking container, a temperature sensitive member having a first portion secured to said support structure to directly receive heat from said container through said support structure and having a second portion movable relative to said first portion in proportion to the temperature of said temperature sensitive member and in proportion to the temperature of said cooking container, trip means operable between a stable reset condition and a stable tripped condition and connected to said second portion of said temperature sensitive member for operation by said temperature sensitive member from a reset condition to said tripped condition when the temperature of said temperature sensitive member is at a certain high temperature of on the order of at least 500° F., said trip means being thereafter operative to remain in said tripped condition irrespective of lowering of the temperature of said temperature sensitive member to a temperature of on the order of 70° F. or less, and electric switch means including said electrical contacts connected to said trip means for operation therefrom.

2. In a cooking apparatus as defined in claim 1, said trip means comprising: first and second elements, said first element having a first portion connected to said support structure and a second portion movable relative to said first portion, and said second element being connected between said second portion of said temperature sensitive member and said second portion of said first element, at least one of said first and second elements being operative as a spring to establish a stable reset condition in which said second portion of said first element is on one side of a line between said first portion of said first element and said second portion of said temperature sensitive member and a stable tripped condition in which said second portion of said first element is on the other side of said line between said first portion of said first element and said second portion of said temperature sensitive member.

3. In a cooking apparatus as defined in claim 2, said temperature sensitive member being in the form of an elongated bimetal element, said first element of said trip means being in the form of an elongated metal strip in generally parallel relation to said bimetal element with said first portion of said temperature sensitive element and said first portion of said first element being secured to said support structure in adjacent relation.

4. In a cooking apparatus as defined in claim 3, said second element of said trip means including a generally U-shaped portion of spring metal having ends engaged between said second portion of said temperature sensitive member and said second portion of said first element.

5. In a cooking apparatus as defined in claim 4, said second element of said trip means having a portion projecting from one end of one leg of said U-shaped portion for forming a manually engageable reset lever.

6. In a cooking apparatus as defined in claim 3, said electrical switch means comprising a pair of resilient metal strips in generally parallel relation to said metal strip forming said first element of said trip means, and interengageable contacts on said metal strips of said electrical switch means.

7. In a cooking apparatus as defined in claim 1, means for adjusting said trip means to adjust the value of said high temperature at which said trip means is tripped from said reset condition to said tripped condition.

8. In a cooking apparatus as defined in claim 3, means for adjustably deflecting said metal strip forming said first element of said trip means to adjust the value of the temperature at which said trip means is tripped from said reset condition to said tripped condition.

9. In a cooking apparatus as defined in claim 3, said electric switch means comprising: a pair of resilient metal strips in generally parallel relation to said metal strip forming said first element of said trip means, a pair of interengageable contacts on said metal strips of said electrical switch means, means for holding said contacts in engagement in said reset condition of said trip means including a member of insulating material between one of said strips of said electrical switch means and said metal strip forming said first element of said trip means, and adjustment means engageable with the other of said metal strips forming said electrical switch means for operating through said contacts and said member of insulating material to adjust the position of said first element in said reset condition of said trip means and to thereby adjust the value of the temperature at which said trip means is operated from said reset condition to said tripped condition.

* * * * *